UNITED STATES PATENT OFFICE.

DELANEY ARKWRIGHT, JR., OF YOUNGSTOWN, OHIO.

PROCESS OF WELDING.

1,051,980.　　　　Specification of Letters Patent.　　Patented Feb. 4, 1913.

No Drawing.　　　　Application filed July 26, 1912. Serial No. 711,728.

*To all whom it may concern:*

Be it known that I, DELANEY ARKWRIGHT, Jr., a citizen of the United States, residing at Youngstown, in the county of Mahoning and State of Ohio, have invented a new and useful Process of Welding, of which the following is a specification.

The present invention relates to improvements in a process of (as above), and the primary object of the invention is the production of a process, whereby high speed or tool steel, containing tungsten and silicon, is readily and efficiently welded or connected to a softer or less expensive steel, or iron, a mixture of ferromanganese, as is usually employed to increase the density and hardness of steel, and ferrous carbonate, being employed in such process, and assisting in forming as will later appear the connecting element.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In carrying out this invention, a mixture of ferromanganese (pulverized) $66\frac{2}{3}\%$, ferrous carbonate (pulverized) $33\frac{1}{3}\%$, are employed.

The process beginning with its initial step is as follows:—A piece of high speed or tool steel, or self hardening tool steel, and the piece of soft steel or iron to which the hard steel is to be welded, are cleaned in any suitable manner at the point for union. The softer steel, or iron is placed on an anvil, or any available place and the compound composed of pulverized ferromanganese and ferrous carbonate is now spread upon the cleaned surface of the softer steel or iron. The piece of high speed or tool steel is now placed upon the soft steel or iron with the welding compound interposed. The two pieces of metal, thus positioned, are placed in a suitable furnace, and are subjected to a temperature of approximately 2300 degrees Fahr., for a period of about 10 minutes at which time the metals have attained the above temperature. The temperature is now gradually increased to a welding heat of approximately 2500 degrees Fahr., so that tool steel is forming with the compound and the softer steel or iron, an intermediate or graduated metal fused or homogeneous with the high speed or tool steel and such soft steel or iron. This uniting or fusing action is accomplished without the use of the usual borax flux, and at the exceedingly high temperature, approximately 2500 degrees Fahr.; this result is accomplished with the pulverized compound and renders the employment of the usual iron insert unnecessary. After these metals have been heated to the desired temperature, they are removed from the furnace, and either set aside to cool, or are placed under pressure. It has been found that the two pieces of metal are united, for all purposes, by the heat and that the pressure is not absolutely necessary.

The ferromanganese employed is the manganese alloy usually employed to increase the density and hardness of steel; and the ferrous carbonate employed is in the form of an ore, both elements being readily obtained, but having been demonstrated by practice to be highly efficient in forming in reality a graduation in the grade of metals from the soft steel or iron stock to the high speed or tool steel, the same forming a connection of such homogeneity as to make it possible to use an exceedingly small piece of the expensive high speed or tool steel with a soft steel or iron supporting medium. By this means the resulting element is especially adapted for use in cutting chilled steel rolls, it being possible with the process to connect the high speed or tool steel to a softer metal stock, where great tensile and compressive strength is necessary, and where the high speed or tool steel stock would be too brittle and too expensive.

With the use of the above compound, the connection of the soft steel or iron with the high speed or tool steel, in its broadest sense, is not a "weld," but a brazing or fusion between the two metals, the ferromanganese and ferrous carbonate being absorbed or otherwise acting upon the adjacent faces of the two metals, to produce a fusion at such point; the fusion therebetween producing a connection that will dispense with the usual insert of soft iron, generally used and at the same time reduce the cost of the welding process. In other words, it is a fact that the mixture of the pulverized ferromanganese and the pulverized ferrous carbonate produce an agent that displaces the soft iron insert usually employed, and due to its pulverized state readily fuses under such intense heat of 2500 degrees Fahr., to make in reality an insert of metal of a grade between the expensive high speed or tool steel and the inexpensive soft steel or iron.

The analysis of the ferromanganese, as preferably employed in this process, contains 41.25% metallic manganese, while the ferrous carbonate contains 16.20% of iron; thus carrying in the compound 42.55% of carbon and other chemicals which fuse at the high temperature of 2500 degrees Fahr., such compound rendering the employment of borax, or other fluxes, unnecessary, and forming a metal element insert between the high speed or tool steel and the soft steel or iron.

The analysis of the carbonate of iron shows the presence of carbon 0.01%; silicon 0.02%; sulfur 0.02%; and phosphorus 0.04%. When the metals and the welding compound are brought to a melting heat, approximately 2300 degrees Fahr., or about 200 degrees Fahr., below welding heat, there is afforded ample opportunity for this welding compound to melt or fuse, and thus produce the necessary fluxing material in the form of cinder or slag, as it is termed. The manganese also increases the fluidity of the steel or iron. It is therefore apparent from the above, that the welding compound will form its own flux, for as the temperature increases to about 2500 degrees Fahr., the compound is rapidly converted into a metal, a manganese steel or alloy, the intermediate steel between the high speed and soft steel flowing freely into the interstices of the respective tool steel and soft steel or iron to produce an actual cohesion between the adjacent molecules, forming an autogenous weld, at the temperature of approximately 2500 degrees Fahr.

What is claimed is:

1. The herein described process to unite high speed or tool steel to a stock of softer metal consisting in placing upon the softer metal a pulverized mixture of ferromanganese and ferrous carbonate; cleaning the harder metal and placing it in contact with the softer metal with the pulverized mixture therebetween; subjecting the two contacting metals for a period approximating ten minutes to a temperature approximately 2300 degrees Fahr.; increasing the temperature to appromixately 2500 degrees Fahr.; and removing the united metals to cool.

2. The herein described process to unite high speed or tool steel to a stock of softer metal, consisting in placing upon the softer metal a pulverized mixture of ferro-manganese and ferrous carbonate; cleaning the harder metal and placing it in contact with the softer metal with the pulverized mixture therebetween; subjecting the two contacting metals for a period approximating ten minutes to a temperature of approximately 2300 degrees Fahr.; increasing the temperature to approximately 2500 degrees Fahr.; and removing the metals and subjecting their points of juncture to a pressure.

In testimony that I claim the foregoing as my own, I have hereto affixed my signature in the presence of two witnesses.

DELANEY ARKWRIGHT, Jr.

Witnesses:
W. S. Watson,
F. W. Dickinson.